United States Patent [19]
Johnston et al.

[11] Patent Number: 5,144,588
[45] Date of Patent: Sep. 1, 1992

[54] APPARATUS AND METHOD FOR USE IN MARINE SEISMIC SURVEYING

[75] Inventors: Otis A. Johnston, League City; Rick A. Curto, Friendswood, both of Tex.

[73] Assignee: Western Atlas International, Inc., Houston, Tex.

[21] Appl. No.: 637,193

[22] Filed: Jan. 3, 1991

Related U.S. Application Data

[63] Continuation-in-part of Ser. No. 568,248, Aug. 15, 1990.

[51] Int. Cl.$^5$ .............................................. G01V 1/38
[52] U.S. Cl. ..................... 367/16; 367/144; 367/154; 181/110; 181/120
[58] Field of Search ................... 367/16, 18, 106, 144, 367/154; 181/110, 120; 114/244, 245, 253

[56] References Cited

U.S. PATENT DOCUMENTS

| | | | |
|---|---|---|---|
| 4,087,780 | 5/1978 | Itria et al. | 114/244 |
| 4,716,553 | 12/1987 | Dragsund et al. | 367/144 |
| 4,719,987 | 1/1988 | George, Jr. et al. | 181/120 |
| 4,745,583 | 5/1988 | Motal | 367/106 |
| 4,956,822 | 9/1990 | Barber et al. | 367/144 |

FOREIGN PATENT DOCUMENTS 2109935  6/1983  United Kingdom ................. 367/16

*Primary Examiner*—J. Woodrow Eldred
*Attorney, Agent, or Firm*—Paul S. Madan

[57] ABSTRACT

The invention provides a seismic transmitter source system which includes a floatation device that contains a plurality of air tight chambers in a serial connection. A separate one way check valve is placed between each adjacent pair of the chambers. Pressurized air is continuously supplied to an end chamber. The one-way check valves enable the air to pass to the remaining chambers in one direction. A transmitter subarray containing a plurality of spaced apart transmitters is suspended from the floatation device by means of severasl pivotly connected links. The front end of the transmitter array is connected to a point near the front end of the floatation device. During operation, the seismic transmitter source system is pulled from a tow point located at the front of the floatation device, pulling both the floatation device and the transmitter subarray in substantially a horizontal straight line position while maintaining the transmitter subarray at a near constant depth below the water surface.

5 Claims, 4 Drawing Sheets

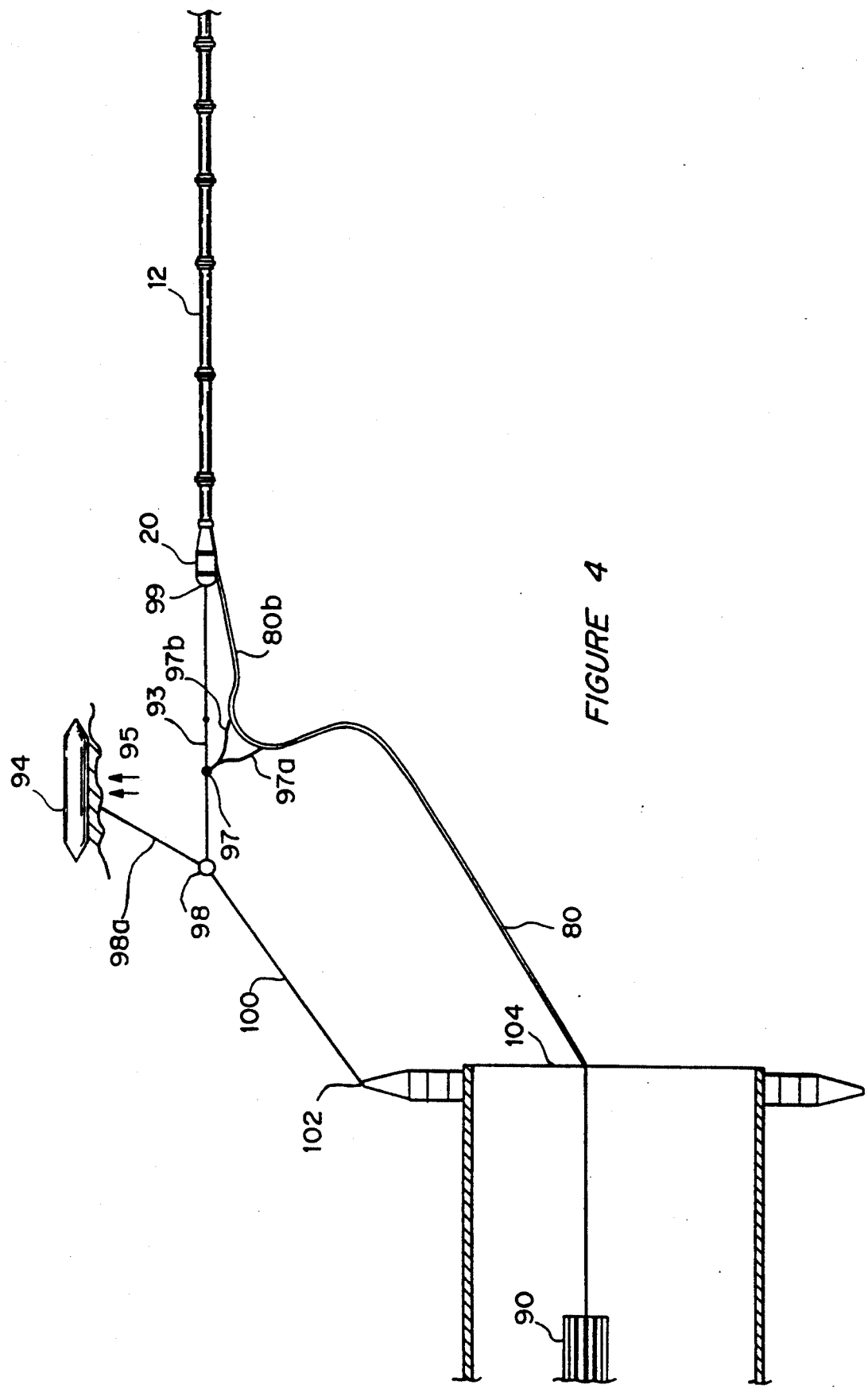

APPARATUS AND METHOD FOR USE IN MARINE SEISMIC SURVEYING

CROSS-REFERENCE TO RELATED APPLICATION

This application is a continuation-in-part of co-pending U.S. patent application Ser. No. 07/568,248, filed Aug. 15, 1990 pending.

BACKGROUND OF THE INVENTION

1. Field of the Invention

This invention relates generally to an apparatus and method for use in seismic surveying and more particularly to a seismic source system for use in marine seismic surveying.

2. Discussion of the Prior Art

In marine seismic surveying, to obtain geophysical information relating to the substrata located below the sea bottom, seismic sources, generally acoustic transmitters, adapted to produce pressure pulses or shock waves under water are towed beneath the water surface behind a marine vessel. The shock waves propagate into the substrata beneath the sea where they are refracted and reflected back to the sea. The returning shock waves are detected by sensors (usually hydrophones) and the useful data contained in the signals produced by the sensors is processed to determine the geophysical structure of the substrata.

Air guns or gas guns are frequently used as acoustic transmitters. Usually, several air guns are placed in spaced relation to each other in a subarray. One or more air gun subarrays are towed behind a marine vessel beneath the sea surface. During operation, all air guns in a subarray are activated simultaneously to produce a desired overall pressure pulse from that subarray. The pulse characteristics, such as the frequency, bubble ratio and amplitude, of the overall pressure pulse produced by an air gun subarray is a function of the characteristics of the pressure pulses produced by the individual air guns and the physical arrangement of the air guns in that air gun subarray.

In order to repeatedly produce and transmit pressure pulses having known characteristics under water, it is important that the air gun subarray is maintained at a constant depth below the water surface and in a near straight line horizontal position. Air gun subarrays presently in use are generally more than fifty (50) feet long and weigh several hundred pounds. To tow such an air gun subarray below the water surface, it is a common practice in the art of seismic surveying to pivotly attach a single or multiple floatation devices (buoys) along the length of the air gun subarray by means of a plurality of links. The floatation device maintains the air gun subarray at or near a constant depth below the water surface when the subarray and the floatation device combination (or the seismic source system) is towed behind a vessel.

U.S. Pat. No. 4,686,660 to Gjestrum et al., issued Aug. 11, 1987, discloses one such system which contains a floatation device (buoy) that has several discrete float chambers disposed in longitudinal spaced relation inside a tubular sleeve member. In the alternative, the discrete float chambers may be secured together longitudinally or they may be connectable lengths of a sleeve. Other prior art floatation systems include utilizing discrete float chamber which are either not connected to each other or are serially linked. However, regardless of the manner in which the prior art discrete float chambers are used to form the floatation device, they are not in fluid (generally air) communication with each other and thus, must be pressurized with air prior to use. Once such a floatation system is deployed, no means exist to refill any of the chambers should an air leak occur without shutting down the entire operation and pulling the subarray and the floatation system onto the vessel for repair or replacement. Such prior art pre-airfilled discrete chambers have frequently failed, due largely to minor air leaks in one or more of the discrete chambers over a period of time, causing a portion of the air gun subarray to sag. This sagging distorts the relative positioning of the air guns in the subarray, thereby distorting the characteristics of the overall pressure pulses produced by that air gun subarray, which, of course, is highly undesirable.

The equipment utilized for seismic surveying includes, among other things, air gun subarrays, seismic cables, data acquisition and processing equipment, and a marine vessel. The total cost of the entire equipment can easily exceed fifteen million dollars ($15,000,000). Due to the high cost of the equipment and the logistics of conducting seismic surveying offshore, the surveying activity is usually, performed around the clock for several days or weeks at a time, except for the time it takes to change crews between working shifts or due to equipment failure. Since there exist no means to replenish the air in the discrete chambers should a leak occur, any failure relating to a floatation system will either require shutting down the surveying activity to pull the floatation system and the air gun on to the vessel or result in obtaining inaccurate seismic data. Neither of these alternatives is, of course, acceptable. It is, therefore, highly desirable to have a reliable floatation system for use in marine seismic surveying whose performance is unaffected by air leaks.

In the prior art, it is typical to tow the air gun subarray and the floatation system from a tow point located in line with the air gun subarray by means of what is commonly known as a "hose bundle." One end of the hose bundle is connected to the tow point and the other is stationed on the deck of the vessel. The hose bundle is pulled by a steel cable attached to it at a suitable place in between the tow point and the vessel. The pulling force on the steel cable is transferred to the hose bundle at the attachment point, making it to be the weak point for the system and thus vulnerable to cracking and breaking.

A typical hose bundle contains a through air hose in the middle for carrying high pressure air to the air gun subarray. The hose is wrapped by one or more layers of electrical conductors for carrying electrical signals between the air guns and sensors on the one hand and the control instrumentation stationed on the vessel on the other hand. Because of the severe bending forces applied to the hose bundle at the attachment point, it tends to damage the air hose and the electrical conductors. It is, therefore, desirable to tow the air gun subarray in a manner which will not damage the hose bundle.

When the subarray is towed from the tow point located on the subarray or which is substantially in line with it, very little or no towing force is applied on the floatation device leaving it free to move in lateral direction. In operation, the air gun subarray is several feet (15-20 feet) below the water surface while the floatation device is at the water surface. Ocean waves at the surface are generally much stronger than at 15 to 20 feet below the surface and cause the floatation device to fish-tail (i.e., cause it to move in a serpentine-like manner), which in turn causes the air gun subarray to also move in the same manner. Again, such a movement of the air gun subarray distorts the relative positioning of the individual air guns in the subarray, distorting the characteristics of the overall pressure pulse. It is, therefore, highly desirable to tow the air gun subarray and the floatation device assembly in a manner which tends to keep both the floatation device and the air gun subarray in straight line when such an assembly is pulled behind a vessel. It is also very desirable to tow an air gun subarray in a manner which does not require towing it by means of a hose bundle. Such a system will require much simpler and less expensive hose bundle construction and improve the overall reliability of the system.

The present invention addresses the above noted problems and provides an air gun subarray and a floatation device assembly (the seismic source system) which utilizes a floatation device that is substantially unaffected by air leaks and which is towed in a manner that tends to keep both the floatation device and the air gun subarray in a straight line horizontal position without imparting substantial tension to the hose bundle.

SUMMARY OF THE INVENTION

A seismic source system for use in marine seismic surveying it disclosed. The system includes a pressure pulse source pivotly connected to a floatation device by a plurality of links. The floatation device contains in a series connection a plurality of chambers. Chambers are maintained in one way fluid communication with each other by check valves installed between adjacent chambers. Pressurized air is continuously supplied to an end chamber in the series from where the air is supplied to the remaining chambers through one way check valves.

The seismic source system is placed in a body of water and towed behind a vessel from a tow point on the floatation device which is near or above the water surface. When the seismic source system is towed behind a vessel in a body of water, the floatation device and the towing arrangement maintains the pressure pulse source at a near constant depth below the water surface and in near horizontal straight line position.

Examples of the more important features of the invention thus have been summarized rather broadly in order that the detailed description thereof that follows may be better understood, and in order that the contributions to the art may be better appreciated. There are, of course, additional features of the invention that will be described hereinafter and which will form the subject of the claims appended thereto.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals and wherein:

FIG. 4 shows a plan view of the air gun subarray and floatation device assembly when it is being towed behind a vessel in a body of water according to the present invention.

DESCRIPTION OF THE PREFERRED EMBODIMENT

Figure 1:
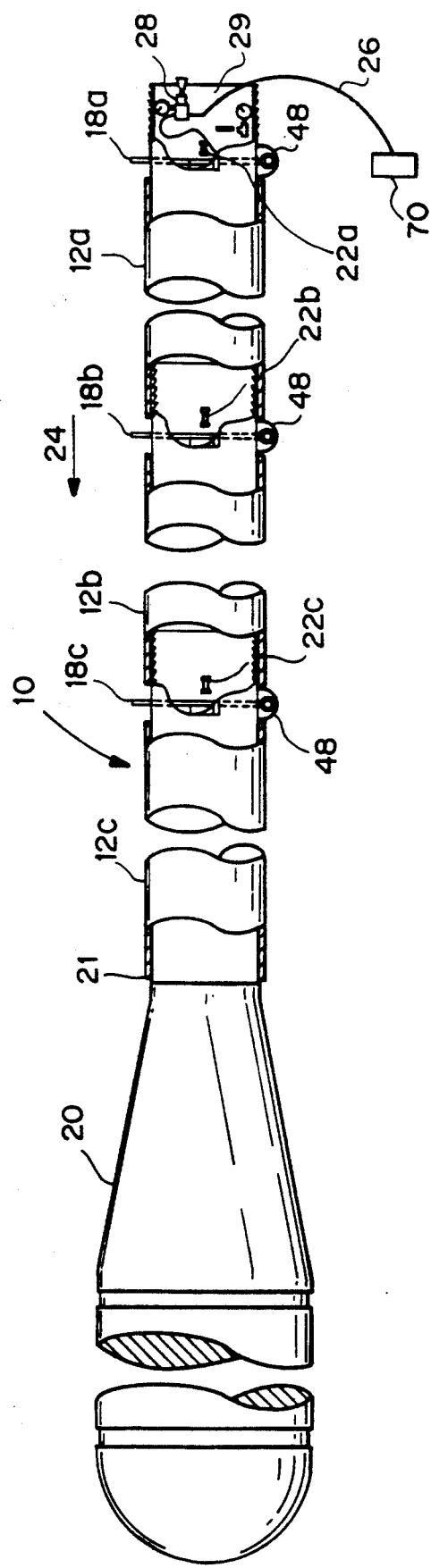
FIG. 1 shows a partial cross-sectional view of the continuously-filled floatation device.

FIG. 1 shows a floatation device which contains in a serial connection several airtight chambers for housing a fluid under pressure, usually air. The chambers are sealingly separated from each other by baffle plates. A separate low pressure threshold one-way check valve is provided for each chamber for passing air from a common air source from the first chamber to the last chamber only in one direction and preventing any air flow between the chambers in the opposite direction.

The floatation device as shown in FIG. 1 is a continuously filled buoy 10, which contains in a serial connection three chambers 12a-c. Although FIG. 1 shows three chambers, the actual number, diameter and length of the chambers will depend upon the specific application for which the floatation device is designed.

A baffle plate 18a seals the outside of the first chamber 12a while baffle plates 18b and 18c sealingly separate adjacent chambers 12a and 12b, and chamber 12b from 12c respectively. The outside end of the last chamber 12c may be open or closed, but in either case is sealingly connected to the end 21 of a nose member 20. A separate one-way pressure check valve from a group of valves 22a-c having a relatively low threshold (about one-third of a psi) is sealingly placed in each baffle plate in such a way that air can flow into each chamber only in the direction from the first to the last chamber while preventing any airflow in the opposite direction. In the structure of FIG. 1, air can flow only in the direction indicated by the arrow 24.

Figure 2:
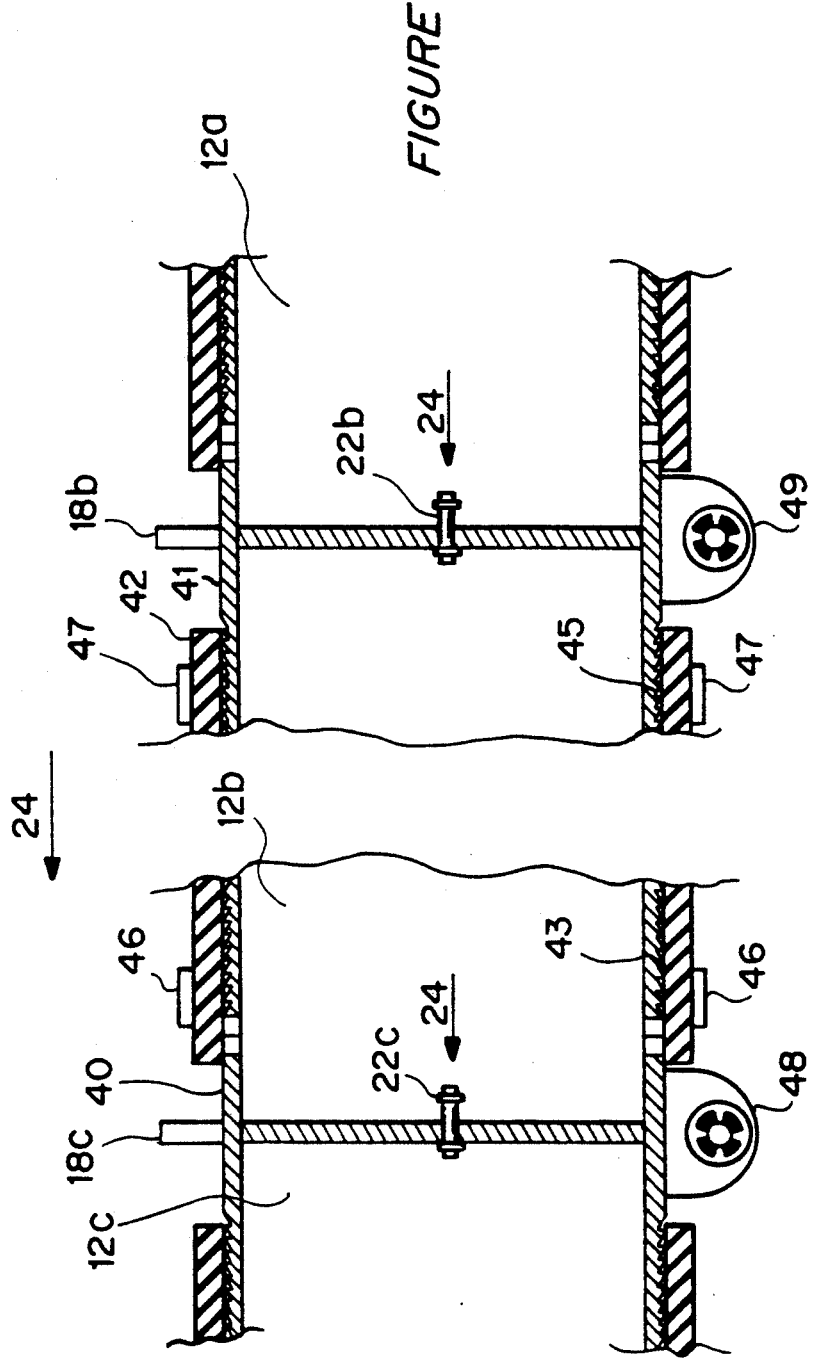
FIG. 2 shows a sectional view of a chamber of the floatation device of FIG. 1.
Figure 3:
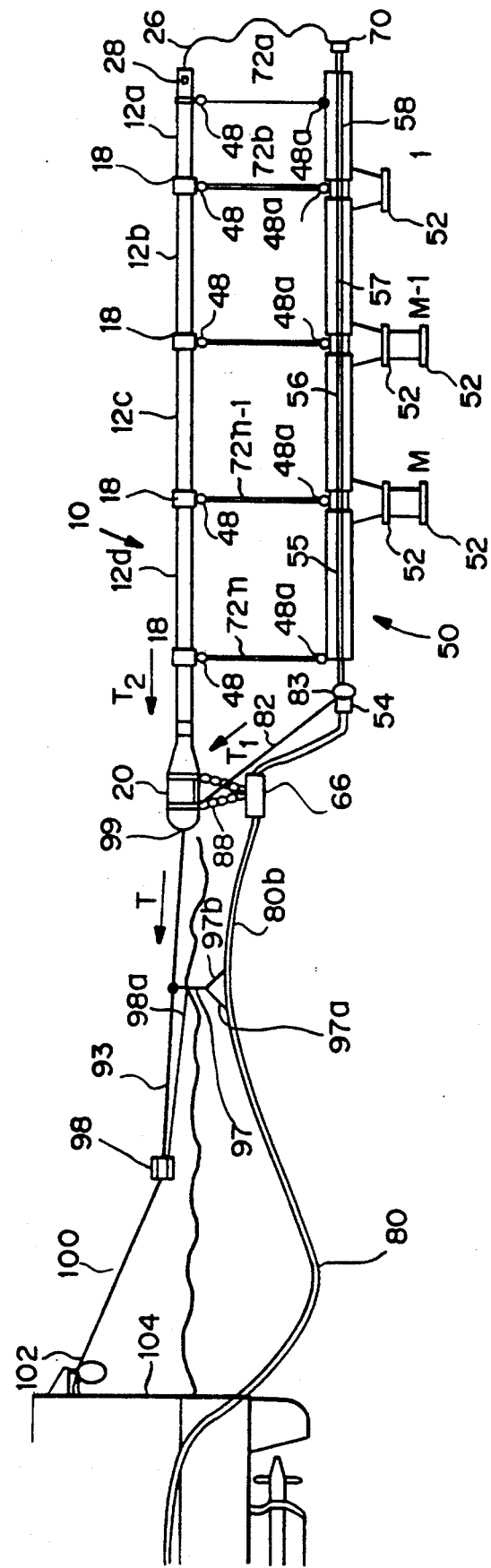
FIG. 3 shows an elevation view of an air gun subarray and floatation device assembly when it is being towed behind a vessel in a body of water according to the present invention.

The construction of individual chambers will now be described in more detail while referring to FIG. 2, which shows the cross-section of a typical air chamber such as 12b. The air chamber 12b is made by joining cylindrical members 40 and 41 by a hose member 42. The members 40 and 41 contain serrations 43 and 45 on their respective outside surfaces. One end of the hose 42 is snugly placed over the serrations 43 of the cylindrical member 40 and the other end over the serration 45 of the cylindrical member 41 to form an airtight chamber 12b. Clamps 46 and 47 may be placed over the hose above the serrations to positively lock the hose 42 to the cylindrical members 40 and 41. Clamps 48 and 49 are provided on the cylindrical members 40 and 41 respectively for pivotly attaching links 72 (FIG. 3) thereto. The cylindrical members 40 and 41 and baffleplates 18b and 18c are preferably made of metal and are made strong enough to support the weight of the air gun subarray 50 (FIG. 3). As noted earlier, check valves 22b-22c are installed in the baffle plates 18b and 18c respectively, which enable the air to flow from chamber 12a to 12b and from chamber 12b to 12c but not in the opposite direction. In this manner, any number of airtight chambers 12 may be constructed in a series.

Now referring back to FIG. 1, when the floatation device 10 is used to maintain an air gun subarray at a constant depth below the water surface, an air source (not shown) is present on the marine vessel from which high pressure air is supplied to each air gun. The same air source is used to continuously supply air to the floatation device 10 via a hose 26. The high pressure air is first supplied to a regulator valve 28, which steps down and maintains the air pressure at: its output end at a predetermined low pressure level, about ten (10) psi. The low pressure air is supplied from the regulator valve to the first chamber 12a through the check valve 22a placed in the first baffle plate 18a by means of a hose 32. The regulator 28, hose 32 and any other elements needed to supply air to the floatation device 10 may easily be placed in a 15 cylindrical section 29 attached to the first chamber 12b.

As noted earlier, to fill the floatation device 10 with air, low pressure air is supplied to the first chamber 12a via check valve 22a. When the pressure in the first chamber 12a builds up to a level that is greater than the threshold pressure of the second check valve 22b installed in the second baffle plate 18b between the first and the second chamber, the check valve 22b opens and enables the air to flow from the first chamber 12a to the second chamber 12b. This process continues until all of the check valves 22a–c are open. Each chamber continues to receive air until the pressure difference between the preceding and the succeeding chamber is equal to or less than the check-valve threshold pressure, thus, filling each chamber with air to about ten (10) psi. Once air has entered in a chamber, the check valve being a one-way type will not allow any air to flow from that chamber to its preceding chamber. The check valve between each pair of adjacent chambers remains closed as long as the air pressure in the succeeding chamber in the sequence does not fall below the pressure in the preceding chamber by more than the threshold of the check valve present between them, which is about one-third of a psi. For example, the check valve 22b will not open unless the pressure in chamber 12b is greater than the pressure in chamber 12b by more than one-third of a psi. Similarly, the check valve 22a will remain open as long as the pressure difference between the regulator valve and the first chamber 12a remains below the threshold level of the check valve 12a.

FIGS. 3 and 4 respectively show elevation and plan views of the floatation device of FIG. 1 and air gun subarray 50 when such an assembly is being towed behind a vessel 104. The use of the floatation device with the air gun subarray and its towing arrangement will now be described while referring to FIGS. 3 and 4. The air gun subarray 50 contains a number of air gun sections, sections I through M, each containing one or more air guns 52. High pressure air, usually at several hundred psi, is supplied from an air source stationed at the vessel to the subarray 50 via a hose bundle 80 that is connected to the subarray at an inlet port 54, which in turn is connected to a pipe made up by serially connecting sections 55–58. Air to each air gun is fed from sections 55–58. The last air pipe section 58 is connected to a cut-off valve 70, which in turn is connected to the regulator valve 28 via the hose 26. In this manner, a common air source may be used to supply high pressure air to the air guns 52 and low pressure air to the floatation device 10. The floatation device 10 is pivotly connected to the air gun subarray 50 by links 72a–n. One end of each link in the link group 72a–n is pivotly connected to the floatation device 10 at a suitable place, such as clamps 48 and the like, while the other end is pivotly connected to the air gun subarray 50 at a suitable place such as clamps 48a. A link 82 pivotly connects the nose member 20 and the air gun subarray at pivot points 83 and 84 respectively.

During marine seismic surveying, the air gun subarray 50 and the floatation device 10, as shown in FIG. 3, are placed in a body of water, usually the sea, and towed behind a vessel, such as a vessel 104. As discussed earlier, the air gun subarray normally is used continuously for several days at a time. If a minor air leak develops in an air chamber, for example in chamber 12c, the air pressure in it will start decreasing, causing the pressure difference between chambers 12b and 12c to exceed the check valve threshold pressure. The check valve 22c between chambers 12b and 12c will then open, allowing air to flow from chamber 12b to 12c. At some point, when the pressure in chamber 12b has become low enough, air from chamber 12a will start flowing into the chamber 12b thereby decreasing the pressure in chamber 12a. Eventually, air from the regulator valve 26 will be supplied to the air chambers 12a–12c. In this manner, each chamber will continue to receive any air that it may have lost due to an air leak. When a persistent air leak develops in a chamber, all chambers placed between the leaking chamber and the first chamber will continue to receive air from the regulator 28 and thereby maintain the desired pressure. Only major air leaks in any of the air chambers 12a–c, which occur very infrequently, may require pulling the floatation device 10 on to the vessel for repair or replacement. Thus, the buoyant characteristics of the continuously-filled floatation device 10 are substantially unaffected by air leaks which may develop during operation.

Now referring to FIGS. 3 and 4, a hose bundle 80 usually placed on a reel on the vessel 104 has one end connected to the subarray inlet port 54. Chain links 88 connect the hose bundle 80 at a clamp 86 and the nose 20. A steel cable 100 is attached to the vessel 104 at one end and to a pull-a-vane 94 at the other end. A snatch block 98 is installed on the steel cable 100 at a suitable place. A pulling cable 93 connects a tow point 99 on the nose 20 of the floatation device 10 and the snatch box 98. To keep the hose bundle in position and to prevent it from tangling with other elements, it is connected to the pulling cable 93 at one or more suitable places by cables 97, 97a and 97b. The hose bundle segment 80b is made sufficiently long to ensure that no significant tension is applied to the hose bundle 80 when the seismic source system is pulled by the cable 93.

During surveying, the vessel pulls behind it the pull-a-vane 94. The pull-a-vane 94 is so constructed that water passes through it and pushes it in the direction of the arrows 95, which is substantially orthogonal to the vessels line of motion. The cable 93 pulls the air gun subarray and the floatation device assembly from the tow point 99 at the nose 20. When the air gun subarray and floatation device assembly is pulled from the tow point 99, the pulling force T is applied to the tow point 99, where it splits essentially into two components $T_1$ and $T_2$. The force T being applied to the floatation device while force $T_2$ is being applied to the air gun subarray via the link 82. When the vessel is moving, the cable 93 pulls the air gun subarray and floatation device assembly together maintaining both the floatation device 10 and the air gun subarray 20 substantially in straight line positions. The tow point 99 always remains forward of the front end 54 of the air gun subarray. The link 82 maintains the relative position between the nose 20 and the point 83 ensuring that the links 72a–n remain in near vertical position, maintaining a constant distance between the floatation device and the air gun subarray.

Thus, in the present invention, the floatation device and the air gun subarray assembly is pulled from a tow point 99 which lies at or near the water surface. The tow point 99 always remains forward of the front end 54 of the air gun subarray. Sufficient pulling force is simultaneously applied to both the floatation device and the air gun subarray to pull each in a straight line fashion.

The foregoing description is directed to a particular embodiment of the invention for the purpose of illustration and explanation. It will be apparent, however, to one skilled in the art that many modifications and changes to the embodiment set forth above are possible without departing from the scope and the spirit of the invention. It is intended that the following claims be interpreted to embrace all such modifications and changes.

We claim:

1. A seismic source system for use in marine seismic surveying, comprising:
   (a) a seismic transmitter array having a plurality of transmitters placed in a spaced relation to each other, each said transmitter adapted to produce a pressure pulse in a body of water;
   (b) a floatation device having a front end, said floatation device containing a plurality of airtight sections in fluid communication with each other, each said airtight section containing therein pressurized fluid, said floatation device pivotally connected to the transmitter array at a plurality of spaced apart locations in a manner such that when the seismic source system is placed in a body of water, the seismic transmitter array is suspended from the floatation device at a predetermined depth below the floatation device in the body of water;
   (c) a hose bundle coupled to the seismic transmitter array for supplying a pressurized fluid to the transmitters and the airtight chambers; and
   (d) a tow line connected to the front end of the floatation device for towing the seismic source system behind a vessel.

2. A seismic source system for use in marine seismic surveying, comprising:
   (a) a seismic transmitter array having a front end and a plurality of transmitters placed in a spaced relation to each other, each transmitter adapted to receive high pressure air and in response thereto producing a pressure pulse in a body of water;
   (b) a floatation device having:
      (i) a nose member;
      (ii) a plurality of air tight chambers connected to each other to form a string, one end chamber in the string terminating at the nose member and the other adapted to receive pressurized air; and
      (iii) a separate one-way fluid check valve placed between each pair of adjacent chambers in the string in a manner which enables the air from the chamber receiving the air to pass to the remaining chambers; and
   (c) The front end of the seismic transmitter array connected to the nose member, said array also connected to the floatation device at a plurality of points in a manner so that when said seismic source array is towed from a tow point on the nose in a body of water, the nose member remains forward of the front end of the seismic transmitter array and that the floatation device maintains the seismic transmitter array at a constant depth and in a horizontal straight-line position below the water surface.

3. A seismic source system comprising:
   (a) an air gun subarray having:
      (i) a frame having a front and rear ends;
      (ii) a plurality of air guns suspended from the frame and placed in a spaced relation to each other, each air gun adapted to produce shock pulses in response to high pressure air; and
      (iii) means for supplying high pressure air to said each gun;
   (b) a floatation device adapted to provide buoyant force to the air gun subarray having:
      (i) a nose member having a tow point thereon;
      (ii) a plurality of air tight chambers connected to form a longitudinal member, the chamber at one end of the longitudinal member connected to the nose member and the chamber at the other end adapted to continuously receive air under pressure; and
      (iii) a separate one-way check valve connected between each pair of adjacent chambers in a manner that enables the air to pass from the chamber receiving the pressurized air to the remaining chambers; and
   (c) the air gun subarray pivotly connected to the floatation device at a plurality of points, and said nose member connected to the front end of the air gun subarray in a manner that will maintain the nose member in front of the air gun subarray when the seismic source system is towed from the tow point in a body of water and also will maintain the air gun subarray at a constant depth below the water surface and in a horizontal straight line position.

4. The apparatus of claim 2 further comprising:
   (a) a hose bundle connected to the seismic transmitter array for supplying high pressure air to the air guns; and
   (b) a tow line connected to the nose member of the floatation device for towing the seismic source system.

5. The apparatus of claim 4 further having a regulator valve connected between the seismic transmitter array and the floatation device for supplying air to the chambers of the floatation device at a predetermined pressure.

* * * * *